United States Patent [19]

Ruppertz et al.

[11] Patent Number: 5,363,446
[45] Date of Patent: Nov. 8, 1994

[54] COMPUTER FOR THE CONTROL STATION OF A MACHINE, MORE PARTICULARLY A PRINTING PRESS

[76] Inventors: Michael Ruppertz, Kaiserstr. 7, 6232 Bad-Soden/Taunus; Dietrich Schebesta, Geschwister-Scholl-Str. 17, 6050 Offenbach/Main; Frank Schonfeld, Franz-Jakoby-Str. 13, 6052 Muhlhiem/Main 3, all of Germany

[21] Appl. No.: 911,961

[22] Filed: Jul. 10, 1992

[30] Foreign Application Priority Data

Jul. 12, 1991 [DE] Germany .............. 4123126

[51] Int. Cl.$^5$ ............................................. H04G 9/00
[52] U.S. Cl. ........................................ 380/4; 380/25; 380/49; 380/50
[58] Field of Search ..................... 380/4, 25, 49, 50

[56] References Cited

U.S. PATENT DOCUMENTS

| | | | |
|---|---|---|---|
| 3,996,449 | 12/1976 | Attanasio et al. | 380/4 |
| 4,757,533 | 6/1988 | Allen et al. | 380/25 |
| 4,937,861 | 6/1990 | Cummins | 380/4 |
| 4,959,860 | 9/1990 | Watters et al. | 380/25 |
| 4,975,950 | 12/1990 | Lentz | 380/4 |
| 5,012,514 | 4/1991 | Renton | 380/4 |
| 5,022,077 | 6/1991 | Bealkowski et al. | 380/4 |
| 5,027,396 | 6/1991 | Platteter et al. | 380/4 |
| 5,091,939 | 2/1992 | Cole et al. | 380/25 |
| 5,115,508 | 5/1992 | Hatta | 380/4 |
| 5,121,345 | 6/1992 | Lentz | 380/4 |
| 5,128,995 | 7/1992 | Arnold et al. | 380/23 |

FOREIGN PATENT DOCUMENTS

0432333A1 6/1991 European Pat. Off. .
3924989A1 2/1991 Germany .

OTHER PUBLICATIONS

"Neue Leitstandtechnik im Zeitungsdruck", p. w140, No. 30, published Sep. 24, 1987.
"Die Intelligente Druckmaschine–demonstriert am Beispiel einer Leitstandtechnik fur die Zukunft," p. w2, No. 11, published Mar. 21, 1991.

Primary Examiner—Salvatore Cangialosi
Attorney, Agent, or Firm—Leydig, Voit & Mayer, Ltd.

[57] ABSTRACT

The invention relates to a user verification system for a personal computer. In a preferred embodiment, the verification system is used to limit access to an operating system for the personal computer used to control a printing press. Access to the operating system is gained through a certification process which reads an identification code on a floppy disk placed in the floppy disk drive for the computer. Access to the operating system and other protected facilities of the computer is gained by inserting a pre-recorded disk into the floppy disk drive prior to booting the computer. The identification code or password is read by a Basic Input Output System (BIOS) procedure during start-up. If a valid identification code is not sensed by the BIOS procedure, then the operator will be denied access to the protected facilities of the computer. If a valid identification code is sensed on the floppy disk, the degree access to the computer facilities is based upon additional information encoded upon the floppy disk drive.

12 Claims, 3 Drawing Sheets

CONTROL STATION COMPUTER

COMPUTER FOR THE CONTROL STATION OF A MACHINE, MORE PARTICULARLY A PRINTING PRESS

FIELD OF THE INVENTION

This invention relates generally to personal computer systems having security mechanisms to limit user access to protected facilities in the computer system. More particularly, this invention relates to a personal computer system used to control a printing press wherein access to selected computer facilities is determined by reading identification information encoded on a floppy disk or other suitable portable electronic storage media during start-up of the personal computer system.

BACKGROUND OF THE INVENTION

Today, printing presses are often controlled and monitored by a control station comprising a personal computer and various peripheral devices for a user to transmit control commands and monitor the operation of the printing press. The user is capable of monitoring and controlling a wide variety of operational parameters of the printing press through the computer and its programs. These monitoring and control functions are generally available through a menu-driven application program which allows the user to select desired operations at a level above the operating system of the computer.

However, the computer, also referred to herein as the control station computer of the printing press, should be capable of more than merely processing control signals and print status information. In accordance with the general aims of the printing industry today, the computer should be used to the fullest extent during the entire production process from the preliminary stages of printing to the final processing of the printed product. This idea is described in "Deutscher Drucker" in "Neue Leitstandtechnik im Zeitungsdruck" at page w140, No. 30, published Sep. 24, 1987 or in "Die Intelligente Druckmaschine—demonstriert am Beispiel einer Leitstandtechnik fur die Zukunft," page w2, No. 11, published Mar. 21, 1991. In addition, DE 3 829 341 A1 describes the use of control station technology in a network configuration in a printing facility.

It is also known from the above mentioned publications, "Neue Leitstandtechnik im Zeitungsdruck" and DE 3 829 341 A1 for a printing press control station to include a keyboard and video display device for enabling a user to input data and commands and to monitor the status of the printing device. As is known, these components are usually incorporated in a color matching consul associated with the printing press.

The primary information processing component of the printer control station is the computer, which is typically a microprocessor based personal computer having certain modifications to its exterior to withstand the operating conditions to which it is exposed in the printing environment.

In accordance with the network concept, it is known that the control station computer is connected via buses and interface components to the printing press, peripheral devices, and other networked computers. In particular the computer is typically connected to a control station video display device to enable the operator to monitor and control the operation of the printing press. The control commands are entered by the operator via the keyboard. These control operations are advantageously performed by a menu-driven application program executed by the control computer under the direction of the operator. The control operations provided by the menu driven interface are typically stored on permanent, non-volatile memory, which is typically a hard disk drive (though the non-volatile memory of the personal computer also includes ROM), and transferred to the volatile random access memory (RAM) during either start-up of the menu-driven program, or any other suitable time such as when the operator specifies a particular command listed on the menu.

The menu-driven user interface provides several advantages. The menu driven interface enables a user with limited knowledge of the control computer's operating system to control the printer by means of the displayed menu options. A further advantage of menu driven control is to avoid the necessity of an operator to access the operating system procedures of the control computer thereby providing protection from inadvertent or unauthorized access to computer facilities to which only a select group of technicians need access. The term "facilities" as used herein refers to all the hardware and software contained within the control station computer and any associated peripheral devices.

The control station typically contains at least one floppy disk drive or other suitable interchangeable mass memory storage means to enable transfer of new programs and data onto a hard disk drive or the RAM. By means of example, the loading of new programs and data into the hard disk drive associated with the control station computer occurs during initial installation of the control station, regular maintenance work, upgrading an old menu driven system, or installation of new features. These software loading tasks are not typically completed by the operator of the control station who performs his duties by means of the options provided by the menu driven printer control interface. Instead, the installation of new software is completed by a select group of highly-qualified technicians who are members of the computer development and maintenance staff.

The use of the typical Disk Operating System (DOS) based personal computer provides significant cost advantages over specially designed control station computers. First, the personal computer enjoys great hardware cost advantages due to the economy of scale and widespread competition which is typical of the personal computer. Therefore, the cost of the computer itself is relatively low. Second, because of the widespread use of the Intel based processors in personal computers, software packages are relatively inexpensive and knowledgeable programmers are relatively plentiful. Third, there is of course no need to develop an operating system for the control station computer. In general, the computer hardware and basic support software is relatively inexpensive for a personal computer based control station in comparison to a computer designed specifically for controlling a printing press.

Furthermore, the floppy disks associated with personal computer based systems are relatively inexpensive, easy to handle and easy to store.

The lack of security is however a significant disadvantage resulting from the use of a DOS based computer in a print control station. Even though the menu driven print control station program may be automatically executed during start-up of a control station computer through proper programming of an automatically executed batch file (autoexec.bat) stored on the hard drive of the computer, the operator may circumvent the execution of this autoexec.bat file by any of several known means. One known method is to terminate the execution of the autoexec.bat file by pressing the "control" and "c" keys simultaneously on the keyboard during start-up of the computer. This method of breaching the security of the computer has been eliminated by removing this key combination from the keyboard of the print control station.

The operator may also by-pass the execution of the autoexec.bat file stored on the hard drive by placing a floppy disk having a bootable sector, operating system software, and an alternative autoexec.bat file in the floppy disk drive prior to start-up of the computer. In such cases, the known Basic Input/Output System (BIOS) and DOS procedures will cause the personal computer to execute the autoexec.bat file on the floppy disk instead of the one stored on the hard disk drive. Therefore, merely removing certain key combinations from the keyboard and programming the autoexec.bat file on the hard drive of a personal computer to automatically execute a menu-driven application program provides no assurance that the operator will only invoke procedures provided by the menu-driven print control station program.

Once the operator has gained access to the commands and procedures of the operating system by means of a bootable floppy disk inserted into the floppy disk drive prior to start-up of the computer, the operator may invoke procedures which were not available to the operator through the menu-driven application program. The operator may delete, alter, or transfer existing files on the hard disk drive. The operator may add and execute new files thus preventing the proper operation of the printer control station. The control station in turn may provide improper printer status information to the operator or cause the control station computer to transmit erroneous control information to the printing press causing a malfunction of the printing station.

The floppy disk drive performs an integral role in the operation of the control station computer. Therefore, one may not solve the above security problem by removing the floppy disk drive. Nor is it a solution to prevent the reading of any floppy disk during start-up of the computer since there must remain a method for authorized persons to gain access to the operating system of the computer during upgrade and maintenance of the computer.

It is known to store passwords in non-volatile memory (the hard disk drive or the ROM), then query a user during start-up of the computer for a password in order to determine the level of access to be permitted the user to the computer's resources. The solution suffers from several disadvantages. Passwords can be forgotten and therefore a retrievable copy of the password may be necessary. Of course, the retrievable copy must be placed in a safe location to prevent others from seeing the password. The password may be seen or heard by another who may then use the password to gain access under the authority granted to the proper user.

SUMMARY OF THE INVENTION

A principal object of the present invention is to provide a secure computer facility for controlling access by operators to protected computer system facilities which generally overcomes the deficiencies of the prior art and to thereby increase the reliability of the operation of the computer facility without restricting maintenance of the computer system.

A more specific object of the present invention lies in providing a simple, reliable pass-key mechanism for a BIOS/DOS based printer control station which may be easily incorporated into existing computer hardware to prevent unauthorized access to the control station computer's operating system and access to programs and procedures on the hard disk drive by means of the keyboard and the floppy disk drive during start-up of the control station computer.

A further object lies in providing a password mechanism which cannot be readily discerned by a casual observer of the log-on procedure performed by a user of the computer.

Another object lies in providing a computer access pass which need not be memorized or visually perceivable by the owner of the pass.

The above objects as well as other advantages are achieved by a personal computer based control station having a modified BIOS to read a password encoded on a floppy disk inserted by a user prior to start-up of the personal computer. If a user inserts a floppy disk that does not contain a proper password or if the user does not insert a floppy disk into the floppy disk drive during start-up, the control station computer will automatically allocate a limited set of commands and procedures a user may invoke by means of a menu-driven user interface. However, if a user inserts a floppy disk containing a valid password into the floppy disk drive prior to start-up, then the user will gain access to a broader range of computer facilities which includes DOS programs and procedures.

Another aspect of the present invention is that the degree of access to the broader range of computer facilities is based upon the presence of additional programs and procedures encoded on the floppy disk bearing a valid password code. The floppy disk for an authorized user contains, in addition to the encoded password, a combination of an autoexec.bat file and DOS procedures enabling an authorized user to access computer facilities which are not available through the menu-driven user interface which is invoked when the computer does not sense a valid password on a floppy disk during start-up.

It is a further aspect of the present invention to recheck a floppy disk for a valid password prior to executing any operation involving the floppy disk drive. This prevents the user of the computer from substituting a floppy disk with a larger set of operating system and application programs for the limited set contained upon the floppy disk containing the valid password used by the user during start-up to boot the computer system from the floppy disk drive.

These aspects of the invention as well as others will be better understood in view of the drawings and the detailed description of the preferred embodiment of the invention which follow.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF THE INVENTION

Figure 1:
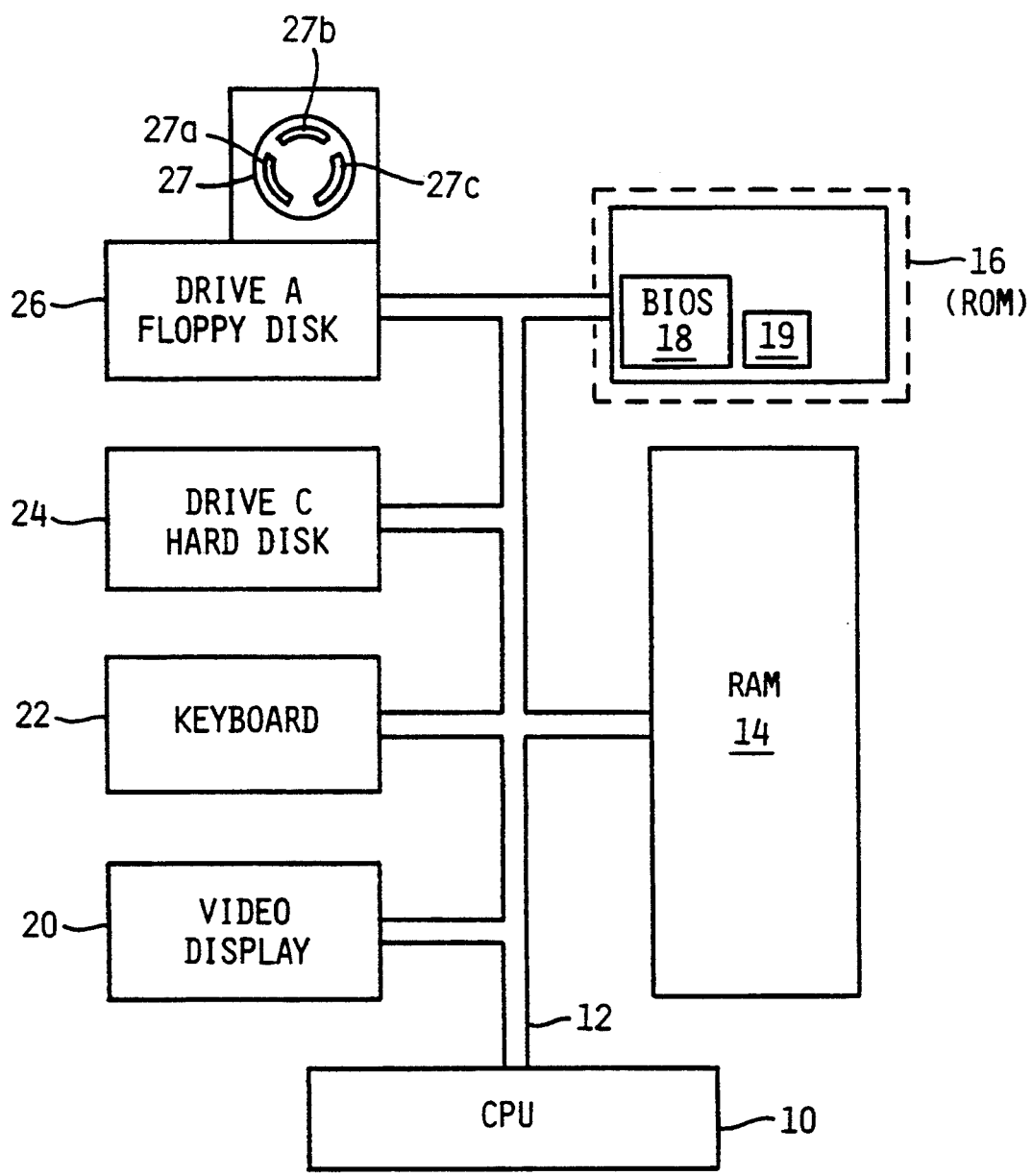
FIG. 1 is a schematic block diagram of the primary components of a control station computer in accordance with present invention.

Referring now to the drawings, FIG. 1 is a schematic block diagram showing the primary components of a control station computer (also referred to herein as the "computer system") embodying the present invention. A central processing unit (CPU) 10 is communicatively coupled by means of a parallel address/data bus 12 to the various components of the control station computer in a manner known to those familiar with the basic architecture of microprocessor based personal computers. The components of the control station computer include a random access memory (RAM) 14 used to store data, operating system procedures and applications programs.

The RAM 14 comprises volatile memory cells which lose there information when power is removed. Therefore, there also exists non-volatile primary memory in the form of a Read Only Memory (ROM) 16. The Basic Input/Output System (BIOS) 18 and a set of valid passwords 19 for booting the control station computer from a floppy disk drive 26 are stored within the ROM 16. The BIOS 18 which includes a set of basic start-up operations and the set of valid passwords 19 will be discussed in greater detail below.

The control station computer also comprises a video display 20 and a keyboard 22. Both the video display 20 and the keyboard 22 are communicatively coupled to the CPU 10 via the address/data bus 12. These components provide an interactive user interface for the control station computer in a manner known to those skilled in the art. In the preferred embodiment, the keyboard 22 contains the necessary modifications known by those skilled in the art to prevent an operator from discontinuing the operation of an applications program (e.g. the "control" and "c" key combination) and gaining access to the operating system.

Additional non-volatile permanent (fixed) memory storage is provided in the form of a hard disk drive 24 coupled to the CPU 10 by means of the address/data bus 12 in a known manner. The hard disk drive 24 is used to permanently store a default autoexec.bat file which is invoked when a bootable floppy disk is not inserted in the floppy disk drive 26 prior to booting the computer. The hard disk drive 24 also contains applications programs as well as other data used during the regular operation of the control station computer illustrated schematically in FIG. 1.

A device for reading from and writing to removable (interchangeable) memory storage media is provided in the form of the floppy disk drive 26 coupled to the CPU 10 by means of the address/data bus 12 in a known manner. The floppy disk drive 26 is used to transfer programs to and from the hard disk drive 24 and to load programs and data into the RAM 14 during operation of the control station computer. Though the preferred embodiment of the present invention contemplates the use of a floppy disk drive 26 for reading from and writing to interchangeable memory, it is within the scope of the present invention to use any suitable interchangeable memory drive and media including without limitation magnetic tape. It would be within the scope of the present invention to use read-only interchangeable memory such as CD ROM's.

A floppy disk 27 in accordance with the present invention contains information which includes a password 27a, a bootable sector 27b, and a set of routines 27c. These portions of the floppy disk 27 will be explained further in connection with the detailed description of FIG. 3.

Figure 2:
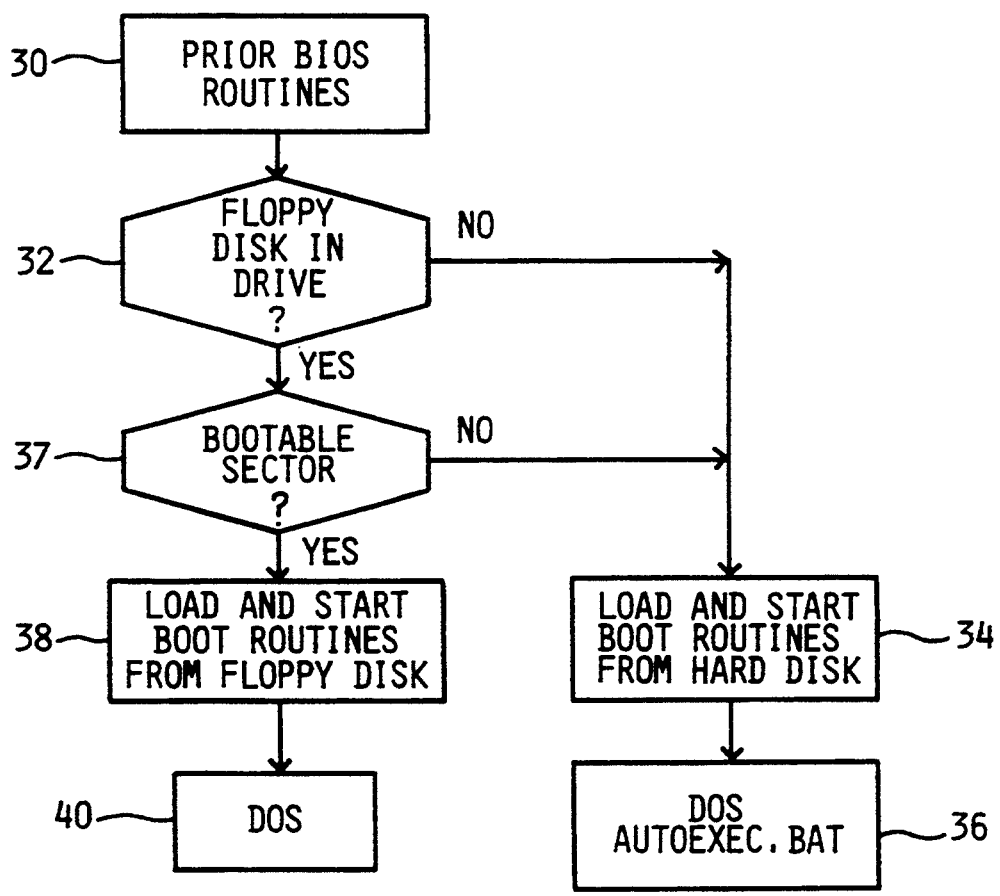
FIG. 2 is a flow diagram of the known start-up procedure executed by a DOS/BIOS based control station computer.

A well known start-up procedure for a personal computer is shown in FIG. 2. After executing a series of test and set-up procedures at step 30, control passes to step 32 wherein the computer determines whether a floppy disk 27 is contained in the floppy disk drive 26 during execution of the BIOS Power-On Reset interrupt routine. If the computer does not detect a floppy disk 27 in the floppy disk drive 26, then control passes to step 34 wherein the computer retrieves known personal computer bootable routines from the hard disk drive 24. These routines include IO.SYS, CONFIG.SYS, MSDOS.SYS, and COMMAND.COM which are well known to those of ordinary skill in the area of personal computer design. After the COMMAND.COM file is installed in the RAM 12 of the computer, the DOS is operational for the control station computer. Thereafter, control passes to step 36 wherein the control station computer executes the autoexec.bat file. In the preferred print station environment the autoexec.bat file includes proper commands for automatically retrieving and commencing execution of the menu-driven print station control program.

If at step 32 the computer determines that the floppy disk drive 26 contains a floppy disk 27, then control passes to step 37 wherein the computer attempts to detect a bootable sector on the floppy disk 27 inserted into the disk drive 26. If no bootable sector is detected on the floppy disk 27, then control passes to step 34 described above which has been described above in connection with the failure by the computer to detect a floppy disk 27 in the floppy disk drive 26.

Continuing with the description of the previously known start-up procedure for a personal computer summarized in the flow diagram of FIG. 2, if the computer detects a bootable sector at step 37, then control passes to step 38 wherein the computer retrieves the above described bootable routines from the floppy disk 27 inserted in the floppy disk drive 26. Control thereafter passes to step 40 wherein DOS is operational. If an operator supplied autoexec.bat file is contained upon the floppy disk 27, then the autoexec.bat file on the floppy disk 27 will be executed by the computer in lieu of the autoexec.bat file contained on the hard disk drive 24.

Therefore, in known personal computers, an operator could by-pass the autoexec.bat file contained on the hard disk drive 24 and gain unintended access to protected system facilities by inserting a bootable disk in the floppy disk drive 26 of the control station computer during start-up.

Figure 3:
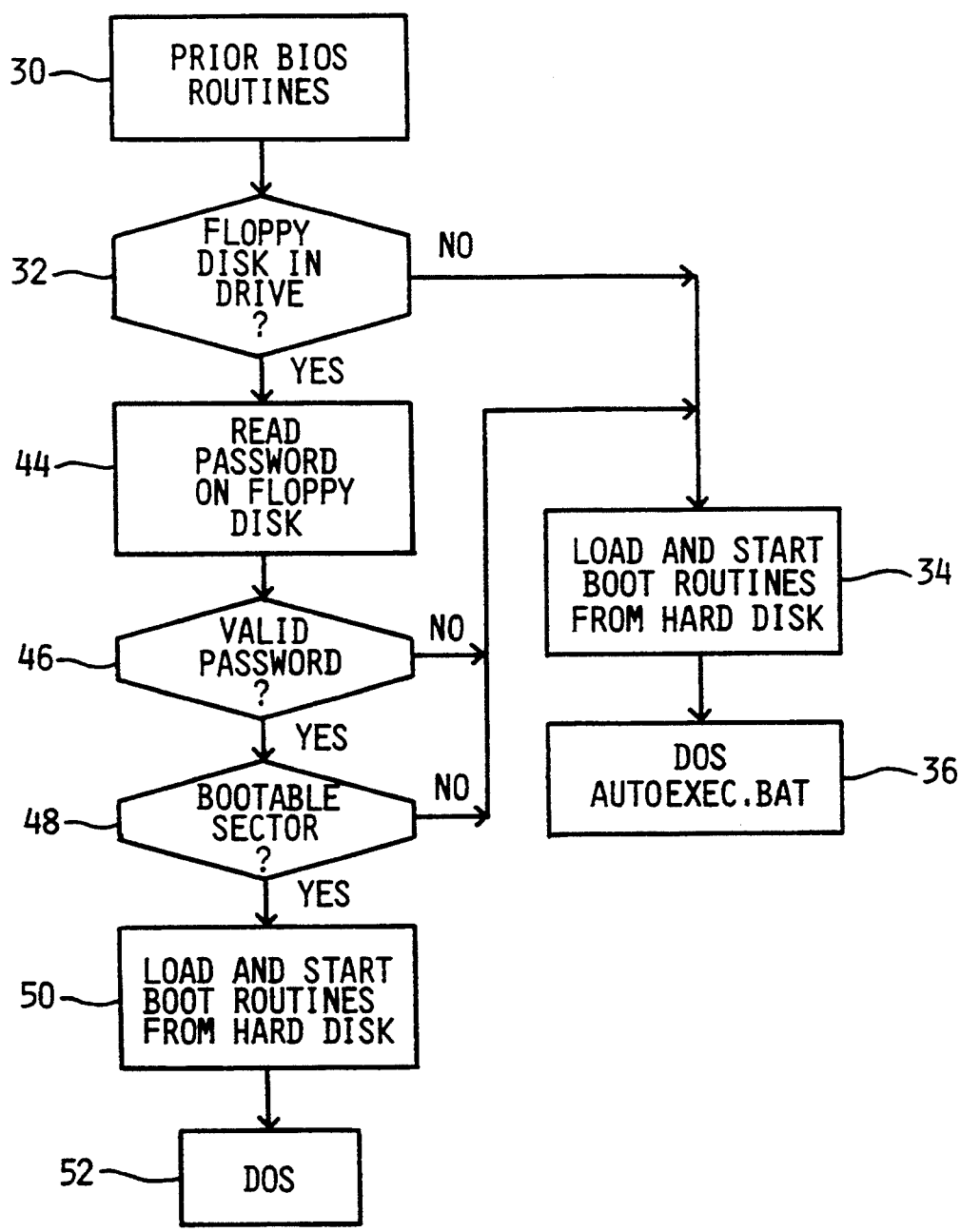
FIG. 3 is a flow diagram of the procedure executed by the DOS/BIOS based control station computer of the present invention during start-up of the control station.

Turning now to FIG. 3, a flow diagram is shown of the modified start-up procedures for the control station computer of the present invention. Steps 30, 32, 34 and 36 of the start-up procedure illustrated in FIG. 3 are the same as the start-up procedure previously known in the prior art. However, the new computer system departs from the prior art in its treatment of the situation where an operator inserts a floppy disk 27 into the floppy disk drive 26 prior to start-up of the control station computer illustrated in FIG. 1 and thereby attempts to boot the control station computer from bootable routines and an autoexec.bat file contained on the floppy disk 27.

These changes are carried out by relatively simple modifications to portions of the BIOS which are executed during the start-up procedures of the control station computer. The modified BIOS is preferably stored within an erasable programmable ROM installed in the control station computer in place of the portion of the ROM 16 containing the prior art BIOS. However, other means for storing the modified BIOS would be known to those skilled in the art.

If the control station computer detects the presence of a floppy disk 27 in the floppy disk drive 26 during step 32, then control passes to step 44 wherein the floppy disk drive 26 reads a password 27a present at a predetermined memory location on the floppy disk 27. The password 27a is read in accordance with the modified BIOS start-up routine associated with the novel control station computer. The computer instructions necessary for instructing the floppy disk drive 26 to read a set of encoded signals from a particular address on a floppy disk 27 is known to those of ordinary skill in the art. Though one should not store the password 27a in portions of the floppy disk 27 reserved for BIOS and DOS, the choice of the encoded password 27a's location is merely a design consideration.

The password 27a which enables booting of the control station computer of the present invention from the floppy disk drive 26 is written onto a floppy disk 27 in a predetermined location by means of known disk I/O interrupt routines. The choice of the code for the password 27a written upon a floppy disk 27 is merely a design consideration. However, the presently preferred embodiment of the invention utilizes checksum encoding and verification of valid password values to identify authorized floppy disks assigned to the various users of the control station computer for a printer. Thus, according to the present invention, the degree of access to the operating system and the commands of the menu-driven interface are determined by the checksum value of the password 27a and the additional subroutines 27c contained on the floppy disk 27 bearing the password 27a.

Next, at step 46, the control station computer determines whether a valid password 27a was retrieved from the predetermined location on the floppy disk 27 during step 44. The control station computer compares the value retrieved from the floppy disk 27 to a set of one or more valid passwords 19 stored in the ROM 16 at a predetermined range of addresses. If the control station computer determines that the retrieved value does not match a valid password from the set of valid passwords 19, then control passes to step 34 wherein the control station computer is booted by means of bootable routines stored upon the hard disk drive 24 in the manner described above.

Therefore, in distinction from the prior art, if a floppy disk 27 inserted into the floppy disk drive 26 during start-up does not contain a valid password, the control station computer will be booted by means of the routines contained on the hard disk drive 24 regardless of whether a bootable sector 27b is contained upon the floppy disk 27. In the preferred embodiment, the control station computer installs and executes the menu-driven print station control program in accordance with an autoexec.bat file installed on the hard disk drive 24, and the operator only has access to the facilities which may by utilized by specifying (by means of the modified keyboard 22) one of the options listed on the menu-driven interface.

If the control station computer determines that the password 27a is a valid password, then control passes to step 48 wherein the control station computer determines whether the floppy disk 27 in floppy disk drive 26 contains a bootable sector 27b. If the floppy disk 27 does not contain a bootable sector 27b, then control passes to step 34 wherein the control station computer is booted by means of bootable routines stored upon the hard disk drive 24 in accordance with the start-up procedure summarized above in connection with the failure at step 46 to detect a valid password.

If the control station computer detects a bootable sector 27b on the floppy disk during step 48, then control passes to step 50 wherein the boot routines (e.g. IO.SYS, CONFIG.SYS, MSDOS.SYS, and COMMAND.COM) are loaded into the RAM 14 from the floppy disk 27. After the COMMAND.COM routine has been loaded into the RAM 14, the DOS is operational and the computer system is ready to receive and execute DOS commands. Control then passes to step 52 wherein the control station computer permits the authorized user access to computer facilities which are only available to users who boot the control station computer by means of a floppy disk 27 bearing a valid password 27a. In the preferred embodiment of the present invention, booting the control station computer from the floppy disk drive 26 causes the computer to default to the DOS plane so that the user may submit DOS commands from the set of available DOS routines included in a set of routines 27c contained on the floppy disk 27.

The size of the expanded set of facilities is determined by additional routines 27c contained upon the floppy disk 27 bearing a valid password 27a. This expanded set of computer facilities includes DOS procedures for carrying out maintenance or installation work associated with the design and repair of the control station computer.

In the preferred embodiment, the floppy disk 27 is the sole source of DOS commands. As will be explained hereinafter, this allows a manager of the print stations to limit the access of various users to the control station computer facilities by assigning disks with a limited set of DOS procedures included in the routines 27c. The set of DOS procedures encoded upon a floppy disk 27 bearing a valid password 27a is tailored to the individual needs of the particular user assigned the floppy disk 27.

In another important aspect of the present invention the floppy disk 27 which carries the access password 27a may be used as interchangeable memory media to copy files to and from the control station computer in order to update the system. The use of the floppy disk 27 in the control station computer of the present invention in this manner requires the presence of the appropriate DOS routines on the floppy disk 27 bearing a valid password 27a.

According to an additional feature of the present invention, different degrees of access to protected computer system facilities are assignable to classes of operators based upon the needs of the particular classes. The different classes of users are defined and administered by a manager or administrator of a printing plant who determines the needs of the various classes of users who design, use and maintain the services provided by the control station computers for the print stations. After the needs are defined for a particular class, the appropriate routines 27c are written to the password bearing floppy disk 27 to be distributed to that class of user. Each class of user is given access through the routines 27c only to the control station computer facilities which are required for the user to fulfill the requirements of his or her job. The user in turn inserts the floppy disk 27 bearing the password 27a into the floppy disk drive 26 of the control station computer prior to the start-up of the computer in order to gain access to the set of routines 27c encoded upon the floppy disk 27.

For example, a research engineer responsible for the design and repair of the printer control station computer possesses a floppy disk 27 containing the software necessary to give access to the entire operating system and other computer facilities including the ability to execute, transfer, modify, and delete specific files by means of the above described modified keyboard 22.

A medium level of access is granted to a computer maintenance technician. This computer operator is assigned a floppy disk 27 specifying a smaller degree of access to executable procedures of the operating system and other computer facilities by means of the previously described modified keyboard 22. For instance, the medium level operator has access to the directory listing of the hard disk drive 24. However, the floppy disk 27 assigned to the medium level operator lacks the necessary encoded information to issue commands to the control station computer to modify the contents of the hard disk drive 24.

Finally, the lowest level operator such as the actual user of the print station has access only to the print station control functions specified by the menu-driven user interface which the control station computer automatically invokes when a valid password is not detected upon a floppy disk 27 inserted into the floppy disk drive 26 prior to start-up of the control station computer.

Furthermore, to prevent unauthorized access to the system facilities after booting the control station computer, the password 27a for the floppy disk 27 is rechecked prior to each access by the control station computer to the floppy disk 27 and to the data and procedures contained thereon. This manner of rechecking the floppy disk 27 for a valid password requires modifications to each BIOS subroutine which effects an access to the floppy disk 27 contained on the floppy disk drive 26. The modifications to the BIOS subroutines are analogous to the changes to the start-up routines in the BIOS which, in accordance with the present invention, prevent booting of the control station computer from routines contained on a floppy disk which does not contain a valid password. The actual changes to the operating system procedures in order to implement this password checking procedure would be known to one of ordinary skill in the art in view of the above description.

It will be appreciated by those skilled in the art that modifications to the foregoing preferred embodiment may be made in various aspects. The present invention is set forth with particularity in the appended claims. It is deemed that the spirit and scope of that invention encompasses such modifications and alterations to the preferred embodiment as would be apparent to one of ordinary skill in the art and familiar with the teachings of the present application. Such modifications would include substitution of another known personal computer operating system and I/O system for the presently preferred BIOS/DOS systems.

I claim as my invention:

1. A control station computer having a plurality of configurations, the particular configuration depending upon the value of a password retrieved from electronically sensed interchangeable memory media inserted into an interchangeable memory drive during start-up of the control station computer comprising:

a central processing unit;
non-volatile memory storage;
a set of one or more passwords stored in the non-volatile memory storage;
security means for reading a password stored on a first portion of the electronically sensed interchangeable memory media inserted into the interchangeable memory drive prior to start-up of the control station computer to determine whether the password on the first portion of the electronically sensed interchangeable memory media matches a one of the set of one or more passwords stored in the non-volatile memory storage; and
means for booting the control station computer from a set of routines stored within a bootable portion of the electronically sensed interchangeable memory media when the password read from the first portion of the electronically sensed interchangeable memory media matches a one of the set of one or more valid passwords stored in the non-volatile memory storage.

2. The control station of claim 1 wherein said security means includes means for executing a checksum operation upon the password stored on a first portion of electronically sensed interchangeable memory media inserted into the interchangeable memory drive prior to start-up of the control station computer in order to determine whether the password matches a one of the set of one or more valid passwords stored in the non-volatile memory storage.

3. The control station computer of claim 1 wherein the electronically sensed interchangeable memory media includes a second portion containing a set of routines executable by the computer control station.

4. The control station computer of claim 3 wherein the second portion of the electronically sensed interchangeable memory media includes encoded operating system routines.

5. The control station computer of claim 4 wherein the encoded operating system routines are DOS routines.

6. The control station computer of claim 3 wherein the interchangeable memory drive is a floppy disk drive.

7. The control station computer of claim 1 further comprising means for preventing an operator of the control station computer from gaining access to the operating system by discontinuing the operation of an applications program.

8. The control station computer of claim 7 wherein said means for preventing an operator from gaining access to the operating system comprises a modified keyboard interface to the control station computer wherein the entry of known password combinations for discontinuing the execution of an applications program and transferring control to the operating system is prevented.

9. The control station computer of claim 1 further comprising means for reading, in response to a request to access the electronically sensed interchangeable memory media, the password stored on a first portion of the electronically sensed interchangeable memory media inserted into the interchangeable memory drive prior to the request to access the electronically sensed interchangeable memory media to determine whether the password stored on the first portion of the electronically sensed interchangeable memory media matches a one of the set of one or more passwords stored in the non-volatile memory storage.

10. A method for restricting access to protected personal computer facilities having a central processing unit, an interchangeable memory drive, electronically sensed interchangeable memory media, a non-volatile memory storage, and a set of one or more passwords stored in the non-volatile memory storage comprising the steps:

first reading a password stored on a first portion of the electronically sensed interchangeable memory media inserted into the interchangeable memory drive prior to start-up of the control station computer;

matching the password stored on a first portion of the electronically sensed interchangeable memory media to a one of the set of one or more passwords stored in the non-volatile memory storage; and booting the control station computer from a set of bootable routines stored upon the electronically sensed interchangeable memory media in response to a successful password match in accordance with said matching step.

11. The method of claim 10 wherein said reading step comprises determining the checksum value stored on the predetermined portion of the information stored on the floppy disk.

12. The method of claim 10 further comprising:

receiving a request effecting an access to the electronically sensed interchangeable memory media;

second reading, in response to a request to access the electronically sensed interchangeable memory media, the password stored on a first portion of the electronically sensed interchangeable memory media inserted into the interchangeable memory drive prior to said receiving step;

second matching the password read in said second reading step to a one of the set of one or more passwords stored in the non-volatile memory storage;

effecting an access to the electronically sensed interchangeable memory media in accordance with the request in response to a successful password match in accordance with said second matching step.

* * * * *